(12) United States Patent
Kowligy et al.

(10) Patent No.: US 11,953,804 B1
(45) Date of Patent: Apr. 9, 2024

(54) INTEGRATED NONLINEAR PHOTONIC WAVEGUIDE ASSEMBLY FOR FREQUENCY COMB STABILIZATION

(71) Applicant: Vector Atomic, Inc., Pleasanton, CA (US)

(72) Inventors: Abijith Sudarsan Kowligy, Livermore, CA (US); Arman Cingoz, Pleasanton, CA (US); Jonathan David Roslund, Pleasanton, CA (US)

(73) Assignee: Vector Atomic, Inc., Pleasanton, CA (US)

( * ) Notice: Subject to any disclaimer, the term of this patent is extended or adjusted under 35 U.S.C. 154(b) by 0 days.

(21) Appl. No.: 18/450,199

(22) Filed: Aug. 15, 2023

(51) Int. Cl.
*G02F 1/39* (2006.01)

(52) U.S. Cl.
CPC .......... *G02F 1/395* (2013.01); *G02F 2203/56* (2013.01)

(58) Field of Classification Search
CPC .................................................. G02F 2203/56
See application file for complete search history.

(56) References Cited

U.S. PATENT DOCUMENTS

| | | | |
|---|---|---|---|
| 7,881,620 B2 * | 2/2011 | Nicholson | G02F 2/002 398/189 |
| 8,787,767 B2 * | 7/2014 | Wilkinson | H04B 10/548 398/140 |
| 8,982,450 B2 * | 3/2015 | Cox | H01S 3/1305 372/18 |
| 9,110,219 B1 | 8/2015 | Zhang et al. | |
| 9,354,485 B2 * | 5/2016 | Fermann | G02F 1/39 |
| 10,048,567 B2 * | 8/2018 | Papp | G02F 1/3501 |
| 10,522,962 B2 * | 12/2019 | Krausz | H01S 3/0092 |
| 10,859,889 B2 | 12/2020 | Zia et al. | |
| 11,025,027 B2 * | 6/2021 | Rolland | H01S 3/1394 |
| 11,469,567 B2 * | 10/2022 | Fejer | G02F 1/395 |

OTHER PUBLICATIONS

Haider Zia et al., "Ultraefficient on-Chip Supercontinuum Generation from Sign-Alternating-Dispersion Waveguides," Advanced Photonics Research, 2023, 4, 2200296, pp. 1-9.
Richard Oliver et al., "Soliton-effect compression of picosecond pulses on a photonic chip," Optic Letters, vol. 46, No. 18, Dated: Sep. 15, 2021, pp. 1-4.
D. Carlson et al., Photonic-Chip Supercontinuum with Tailored Spectra for Counting Optical Frequencies, Phys. Rev. Appl. 8, 014027 (2017).

(Continued)

*Primary Examiner* — Rhonda S Peace
*Assistant Examiner* — R. Peace
(74) *Attorney, Agent, or Firm* — Patterson + Sheridan, LLP

(57) ABSTRACT

Embodiments herein describe generating signals for stabilizing a frequency comb using a PIC that contains a two-segment supercontinuum generator waveguide (SGW). A first segment of the SGW is designed to spread the spectrum of the frequency comb so that a significant portion of the spectral intensity of the frequency comb is at double the original frequency of the frequency comb. A second segment of the SGW is designed to spread the spectrum of the frequency comb so that a significant portion of the spectral intensity of the frequency comb is at a frequency of a reference laser.

30 Claims, 14 Drawing Sheets

(56) References Cited

OTHER PUBLICATIONS

E. Lamb et al., Optical-Frequency Measurements with a Kerr Microcomb and Photonic-Chip Supercontinuum, Phys. Rev. Appl. 9, 024030 (2018).
Neetesh Singh et al., "Supercontinuum generation in varying dispersion and birefringent silicon waveguide," Optics Express, vol. 27, No. 22, Dated: Oct. 28, 2019, pp. 1-15.
Neetesh Singh et al., "Supercontinuum generation in silicon Bragg grating waveguide," Appl. Phys. Lett. 118, Dated: Feb. 19, 2021, pp. 1-6.
David Carlson et al., "Generating few-cycle pulses with integrated nonlinear photonics," vol. 27, No. 26, Dated: Dec. 23, 2019, pp. 1-9.

* cited by examiner

INTEGRATED NONLINEAR PHOTONIC WAVEGUIDE ASSEMBLY FOR FREQUENCY COMB STABILIZATION

STATEMENT OF GOVERNMENT INTEREST

This invention was made with government support under contract N00014-22-C-1041 awarded by the United States Office of Naval Research. The government has certain rights in the invention.

BACKGROUND

Field

Embodiments of the present invention generally relate to performing supercontinuum generation in a photonic integrated circuit (PIC) to stabilize the carrier-envelope offset (CEO) frequency and the repetition frequency of a frequency comb.

Description of the Related Art

Optical atomic clocks offer improved frequency instabilities compared to microwave frequency standards due to the higher quality factor Q associated with an optical resonance. Many optical atomic clocks use a frequency comb to generate a high-precision electrical clock signal. This, in turn, requires the stabilization of the frequency comb to a high precision reference clock laser.

The frequency comb is stabilized by locking the frequency of the CEO ($f_{CEO}$) and the repetition rate ($f_{rep}$) of the pulses or a tooth in the frequency comb. One stabilization strategy for $f_{CEO}$ locking is self-referencing where a beat note is generated between a frequency doubled lower frequency end of the comb spectrum with a high-frequency end, assuming the spectrum covers an optical octave. Such a broad spectrum can be achieved using supercontinuum generation. Once the comb is self-referenced, the repetition rate can be stabilized by locking a comb tooth to the reference clock laser. In certain implementations, these schemes currently use multiple PICs, which increases size and cost.

SUMMARY

One embodiment presented herein is a photonic integrated circuit (PIC) that includes an optical interface configured to receive a frequency comb and a supercontinuum generation waveguide (SGW) configured to spread a frequency spectrum of the frequency comb to include a first frequency and a second frequency different from the first frequency.

Another embodiment presented herein is a PIC that includes an optical interface configured to receive a frequency comb, a pulse compression waveguide (PCW) configured to compress teeth within the frequency comb, and a SGW configured to spread a frequency spectrum of the frequency comb.

Another embodiment presented herein is a system that includes a PIC configured to receive a frequency comb, the PIC including a SGW configured to spread a frequency spectrum of the frequency comb to include a first frequency and a second frequency different from the first frequency. The system also includes a frequency doubler coupled to an output of the SGW where the frequency doubler is configured to frequency double a portion of the frequency comb at an original frequency.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments herein describe generating signals for stabilizing a frequency comb using a PIC that contains a two-segment supercontinuum generator waveguide (SGW). A first segment of the SGW is designed to spread the spectrum of the frequency comb so that a significant portion of the intensity of the frequency comb is at double the frequency of the original frequency comb. A second segment of the SGW is designed to spread the spectrum of the frequency comb so that a significant portion of the intensity of the frequency comb is at a frequency of a reference laser. For example, for a frequency comb that has a wavelength of 1560 nm and the reference laser that has a wavelength of 1064 nm, the output of the SGW produces a frequency comb that has significant intensity at 780 nm (frequency doubled), 1064 nm, and the original wavelength of 1560 nm.

This optical signal can then pass through a frequency doubler that doubles only the portion of the light in the frequency comb that is still at 1560 nm in order to generate another optical signal at 780 nm. This optical signal can then be detected by a photodiode along with the 780 nm light generated by the first segment of the SGW to generate a first beat note corresponding to the CEO. The light in the optical signal at 1064 nm can be combined with the reference laser (which is at the same wavelength) and detected by a photodiode to generate a second beat note These beat notes can then be used in servo loops to adjust various actuators in the frequency comb in order to stabilize it to the reference laser.

In one embodiment, the reference laser is combined with the frequency comb before the frequency comb passes through the SGW. While it is possible to combine the reference laser to the frequency comb after passing through the SGW, this can require aligning bulk optics in free space which is difficult and susceptible to misalignment due to vibrations. Combining the frequency comb and the reference laser before SGW can avoid these issues. Notably, the reference laser is unaffected as it passes through the SGW.

In one embodiment, the PIC includes a pulse compression waveguide (PCW) through which the frequency comb passes before passing through the SGW. The PCW can narrow (or shrink) the temporal width of each pulse in the frequency comb, which increases the peak intensity of each of the pulses. Doing so means that less average power is needed. This can mean an amplifier (e.g., an Erbium-Doped Fiber Amplifier (EDFA)) used to amplify the frequency comb can consume less power, or the amplifier can be eliminated altogether.

Figure 1:
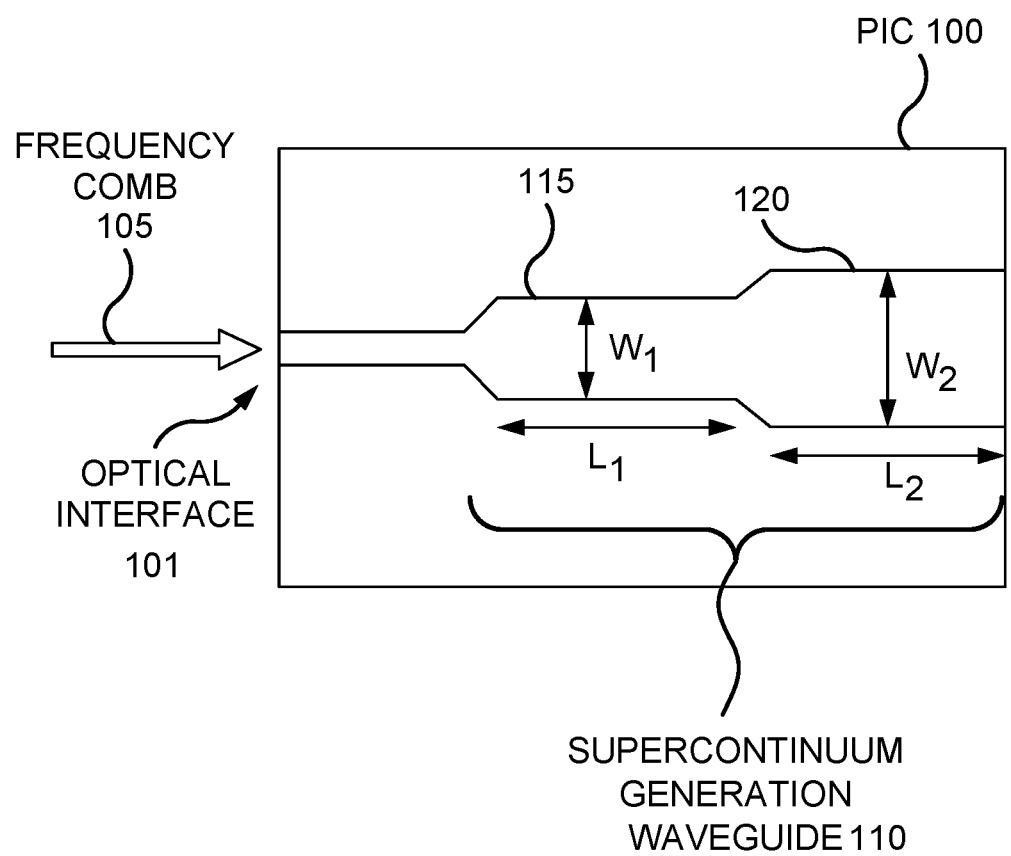
FIG. 1 illustrates a PIC with a two-segment supercontinuum generation waveguide, according to one embodiment described herein.

FIG. 1 illustrates a PIC 100 with a two-segment SGW 110, according to one embodiment described herein. As shown, the PIC 100 receives a frequency comb 105 at an optical interface 101. A frequency comb is a laser source whose spectrum includes a series of discrete, equally spaced frequency lines—i.e., teeth. Frequency combs can be generated by a number of mechanisms, including periodic modulation (in amplitude and/or phase) of a continuous-wave laser, four-wave mixing in nonlinear media, or stabilization of the pulse train generated by a mode-locked laser. In the examples below, the frequency comb 105 is stabilized (or locked) to a reference laser (which is not shown in FIG. 1).

The frequency comb 105 can include "n" comb teeth where the frequency of each tooth can be defined by the following:

$$f_n = n f_{rep} + f_{CEO} \quad (1)$$

where $f_{rep}$ is the repetition rate of the pulses in the frequency comb and $f_{CEO}$ is the offset of the lowest frequency tooth for the frequency comb 105 from zero. In one embodiment, stabilizing the frequency comb 105 includes detecting and stabilizing both $f_{rep}$ and $f_{CEO}$. $f_{CEO}$ can be obtained through octave-spanning supercontinuum generation where two teeth that are at least one octave from each other are heterodyned against each other. $f_{rep}$ can be stabilized using an optical beatnote with the reference laser. If the frequency of the reference laser is not within the envelope of the mode-locked laser output, then supercontinuum generation can also be used to lock $f_{rep}$.

The frequency comb 105 can be coupled into the PIC 100 at the optical interface 101 using edge coupling (e.g., butt coupling or using one or more lenses) or by using a grating. The optical interface 101 is optically coupled to a SGW 110 with a first segment 115 to spread the spectrum of the frequency comb 105 so it includes at least one octave from the original frequency so that $f_{CEO}$ can be determined, and a second segment 120 to spread the spectrum of the frequency comb 105 so that it includes the frequency of the reference laser so that free can be determined. While FIG. 1 illustrates that the first segment 115 abuts the second segment 120, in other embodiments the two segments 115, 120 may be discontinuous such as in FIGS. 9 and 10.

In the embodiments that follow, it is assumed that the frequency comb 105, when input into the PIC 100, has a wavelength of 1560 nm with an envelope of –/+25 nm. Also, it is assumed the reference laser has a wavelength of 1064 nm, which is outside of the spectral frequency band of the frequency comb 105. Thus, the SGW is used to both spread the spectrum of the frequency comb 105 so that it includes teeth separated by at least one octave, and to spread the spectrum to cover the wavelength of the reference laser. As just one example, the reference laser may be a 1064 nm Iodine clock laser.

However, the embodiments herein can include any combination of frequency comb and reference laser. Some example reference lasers include 1157 nm (YbYtterbium), 1068 nm (Aluminum ion), 1378 nm and 1396 nm (Strontium) or 689 and 698 nm (Strontium). Some example wavelengths for the frequency comb 105 include 2 um (Thulium), 1.5 um (Erbium), 1.064 um (Ytterbium), 1.030 um (Ytterbium), 800 nm (Titanium:Sapphire). Any combinations of these wavelengths (and others) can be used in the various embodiments discussed herein.

For example, the PIC 100 may be a nonlinear optical integrated photonic platform that includes a supercontinuum generation waveguide formed from silicon nitride (SiN), Tantala ($Ta_2O_5$), lithium niobate ($LiNbO_3$), lithium niobate on SiN, aluminum nitride, gallium phosphide, silicon, gallium arsenide, or any heterogeneous or hybrid combination of these platforms.

In this example, the first segment 115 has a width W1 and a Length L1 designed to spread the spectrum of the frequency comb 105 such that a substantial amount of the spectral intensity of the light is at double the frequency of the center frequency of the comb 105. Using a 1560 nm frequency comb as an example, the W1 can be 2.6 microns and the L1 can be 5 mm, assuming a silica clad SiN PIC. The thickness of the SiN waveguide is assumed to be 0.8 microns. Thus, at the end of the first segment 115, some of the intensity (or power) of the frequency comb 105 has moved to 780 nm wavelength. Thus, the first segment 115 functions similar to a frequency doubler, but without switching all the light in the frequency comb 105 to 780 nm.

The second segment 120 has a width W2 and a length L2 designed to spread the spectrum of the frequency comb 105 such that a substantial amount of the intensity of the light is at the wavelength of the reference laser. Using a 1560 nm frequency comb and a 1064 nm reference laser as an example, W2 can be 4.5 microns and L2 can be 3 mm. The thickness of the SiN waveguide is assumed to be 0.8 microns with a silicon dioxide cladding. Thus, at the end of the second segment 120, some of the spectral intensity (or power) of the frequency comb 105 has moved to the 1064 nm wavelength. As discussed later, the light at this frequency can be compared to the reference laser in order to stabilize the frequency comb 105. The functionality of the first and second segments 115, 120 are discussed in more detail in the charts in FIG. 2.

Notably, the dimensions of the first and second segments 115, 120 can also vary depending on the type of material of the PIC 100—e.g., SiN, Tantala, lithium niobate, etc. Also, the functions of the two segments in the SGW could be reversed where the first segment could be designed to shift some of the light in the frequency comb to the same wavelength/frequency as the reference laser while the second segment is designed to frequency double a portion of the light in the frequency comb.

While FIG. 1 illustrates two segments 115, 120 for spreading the frequency spectrum of the frequency comb to include a first frequency (e.g., 780 nm) and a second frequency (e.g., 1064 nm), the embodiments herein are not limited to such. For example, other SGWs may use three, four, or more segments with varying width to spread the frequency spectrum of the frequency comb to include two different frequencies. Further, other SGWs may not change the width in order to achieve this and instead could vary other parameters along the length of the SGW such as thickness or types of material. In that case, the SGW may have only one segment with the same width, rather than having two segments with varying widths as shown in FIG. 1. Thus, the embodiments herein can include any SGW that has varying properties in order to spread the frequency spectrum of the frequency comb to include a first frequency and a second frequency.

Figure 2:
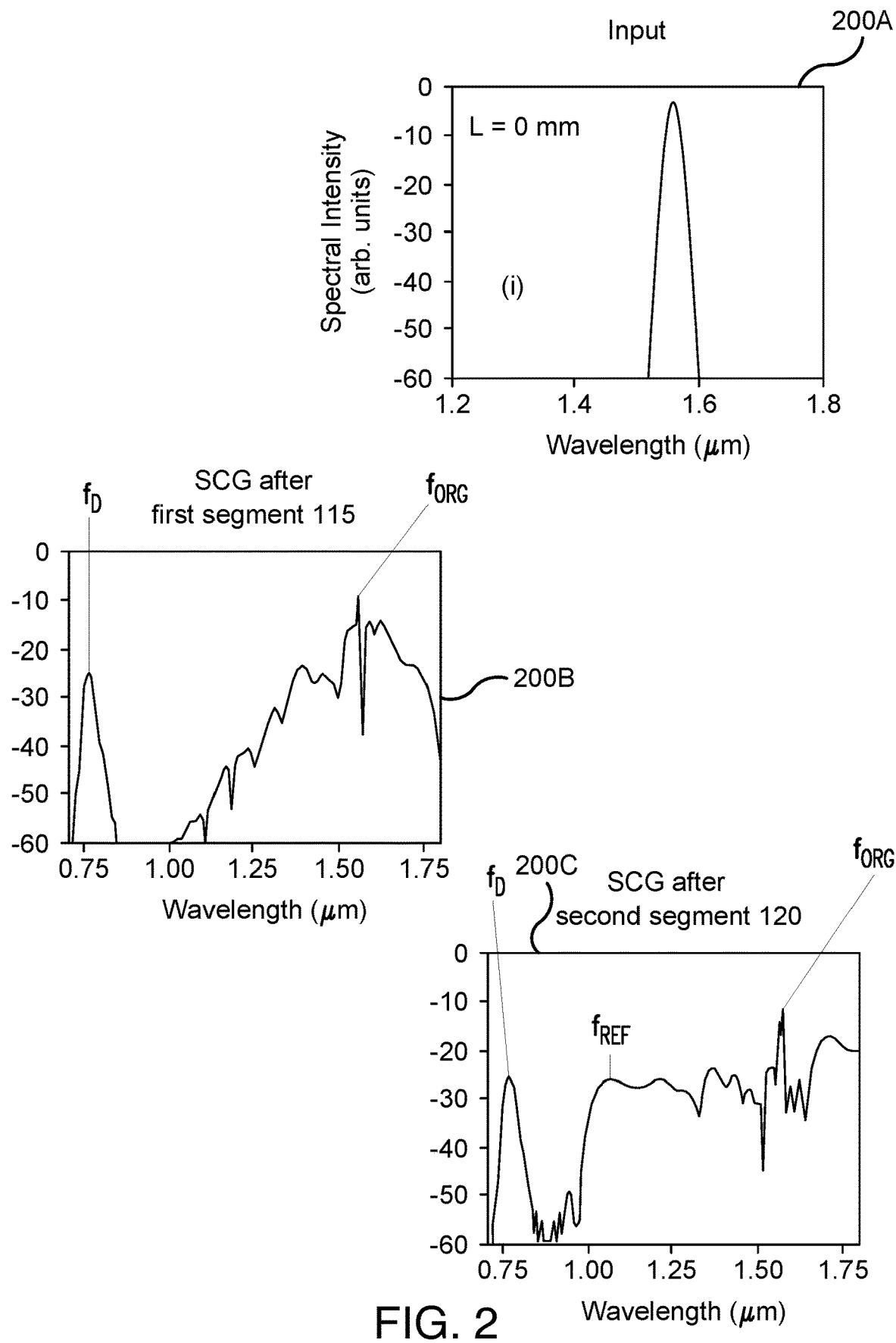
FIG. 2 includes charts illustrating how a frequency comb is changed by the supercontinuum generation waveguide in FIG. 1, according to one embodiment described herein.

FIG. 2 includes charts 200 illustrating how a frequency comb is changed by the SGW 110 in FIG. 1, according to one embodiment described herein. The chart 200A illustrates the frequency spectrum of the frequency comb 105 when it first enters into the PIC 100. As shown, the frequency spectrum is centered around 1560 nm (+/−approximately 25 nm). Thus, essentially all of the spectral intensity of the frequency comb 105 is between 1535 nm and 1585 nm.

Chart 200B illustrates the frequency spectrum of the frequency comb 105 after passing through the first segment 115 of the SGW 110. As shown, the spectral intensity has been spread out to other frequencies. A substantial portion of the intensity is still located at or near 1560 nm; however, another substantial portion of the intensity is now at 780 nm which corresponds to a frequency ($f_D$) that is double the original frequency ($f_{ORG}$) of the frequency comb 105. The term "substantial" means that intensity of the light has been intentionally moved (or kept) at desired frequencies. In this case, the first segment 115 moves some of the spectral intensity of the frequency comb to 780 nm while keeping some of the spectral intensity of the comb 105 at the original frequency corresponding to 1560 nm. As described later, these portions of the frequency comb can be compared to each other (after the 1560 nm light is frequency doubled) to generate a first beat note for stabilizing the frequency comb.

Note that the first segment 115 also moves the spectral intensity of the frequency comb to other frequencies. Although it would be optimal to have essentially all of the spectral intensity of the frequency comb at 1560 nm and 1064 nm, this may not be possible.

As discussed above, it may also be desirable to have a substantial portion of the spectral intensity of the frequency comb 105 at the same wavelength as the reference laser (e.g., 1064 nm). While the chart 200B illustrates that the first segment 115 does shift some of the intensity of the comb 105 to 1064 nm, this may not be sufficient power to compare the comb 105 to the reference laser (e.g., does not provide a sufficient signal-to-noise ratio). The second segment 120 can increase the spectral intensity of the frequency comb 105 at the wavelength (or frequency) of the reference laser.

Chart 200C illustrates the frequency spectrum of the frequency comb 105 after passing through the second segment 120 of the SGW 110. As shown, a substantial portion of the spectral intensity of the frequency comb 105 is now at the same wavelength or frequency ($f_{REF}$) of the reference laser. Thus, as described later, this portion of the frequency comb can be compared to the reference laser to generate a second beat note for stabilizing the frequency comb.

The charts 200A-C illustrate how a portion of the frequency comb 105 can be shifted to a spectral band at double the original carrier frequency (e.g. chart 200B) and another portion can be shifted to a frequency of a reference laser (e.g., chart 200C). If different types of frequency combs and reference lasers are used (which can have different wavelengths/frequencies), the dimensions of the first segment 115 and the second segment 120 can be adjusted in order to achieve the same functionality as shown in charts 200A-C.

Figure 3:
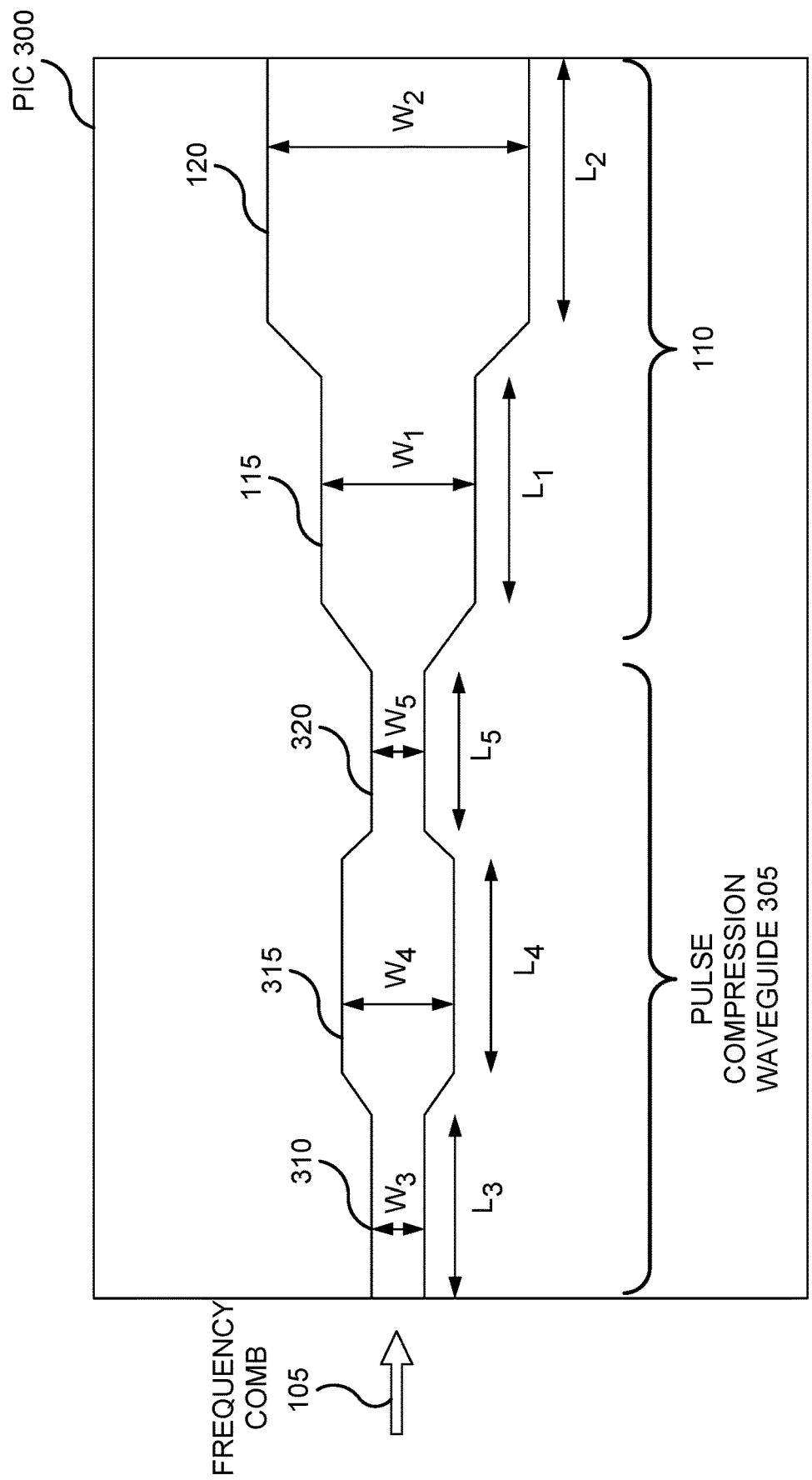
FIG. 3 illustrates a PIC with a pulse compression waveguide and a supercontinuum generation waveguide, according to one embodiment described herein.

FIG. 3 illustrates a PIC 300 with a pulse compression waveguide (PCW) 305 and the SGW 110, according to one embodiment described herein. In this example, the frequency comb 105 first passes through the PCW 305 before reaching the SGW 110. Generally, the PCW 305 compresses each of the temporal pulses making up the frequency comb 105. For example, when entering the PIC 300, each pulse may have a duration of 250 femtoseconds. However, the PCW 305 may compress each of the pulses so they have a duration of 50 femtoseconds. Compressing the duration of the pulses increases their peak intensity. Increasing the peak intensity allows for a lower power frequency comb 105. For example, performing pulse compression may reduce the power consumed by an amplifier (not shown), or mean that the amplifier can be omitted altogether.

While pulse compression can be performed using non-linear fiber, this can take several meters of optical fiber. The PCW 305 can achieve similar results but using a waveguide with a length of less than 10-50 millimeters. The PCW 305 uses nonlinear spectral broadening in normal dispersion waveguides to reduce modulation instability noise and compress temporally in an anomalous dispersion waveguide that has the same magnitude group-velocity (and high-order) dispersion but of opposite sign. This will be shown in the charts in FIG. 4.

In this implementation, the PCW 305 includes a third segment 310, a fourth segment 315, and a fifth segment 320. Again assuming the platform is SiN with thickness 0.8 microns with silicon dioxide cladding, a 1560 nm frequency comb 105, the third segment 310 can have a width W3 of 0.9 microns and a length L3 of 15 mm, the fourth segment 315 can have a width W4 of 2 microns and a length L4 of 5 mm, and the fifth segment 320 can have a width W5 of 0.9 microns and a length L5 of 2 mm. Note that the dimensions of the third, fourth, and fifth segments 310, 315, 320 can vary depending on central frequency of the comb 105 and the type of material of the PIC 300—e.g., SiN, Tantala, lithium niobate, etc.

In general, the third segment 310 broadens the frequency span of the pulses in order to support a shorter duration pulse in the time domain. However, the different frequencies of the light (e.g., different colors) may travel faster than other frequencies through the third segment 310. The fourth segment 315 reverses this to perform temporal compression where the different frequencies/colors realign in time. The fifth segment 320 can be an additional (and optional) dispersive waveguide to pre-shape the pulses, which may be useful for spectral tailoring.

While FIG. 3 illustrates using the PCW 305 with a two-segment SGW 110, the embodiments are not limited to such. For example, the PCW 305 can be used in a one-segment SGW—e.g., a SGW that spreads the spectrum of the frequency comb only once, rather than multiple times. For example, the reference laser may have a frequency within the frequency spectrum of the frequency comb, and thus, a second SGW segment is not needed.

Figure 4:
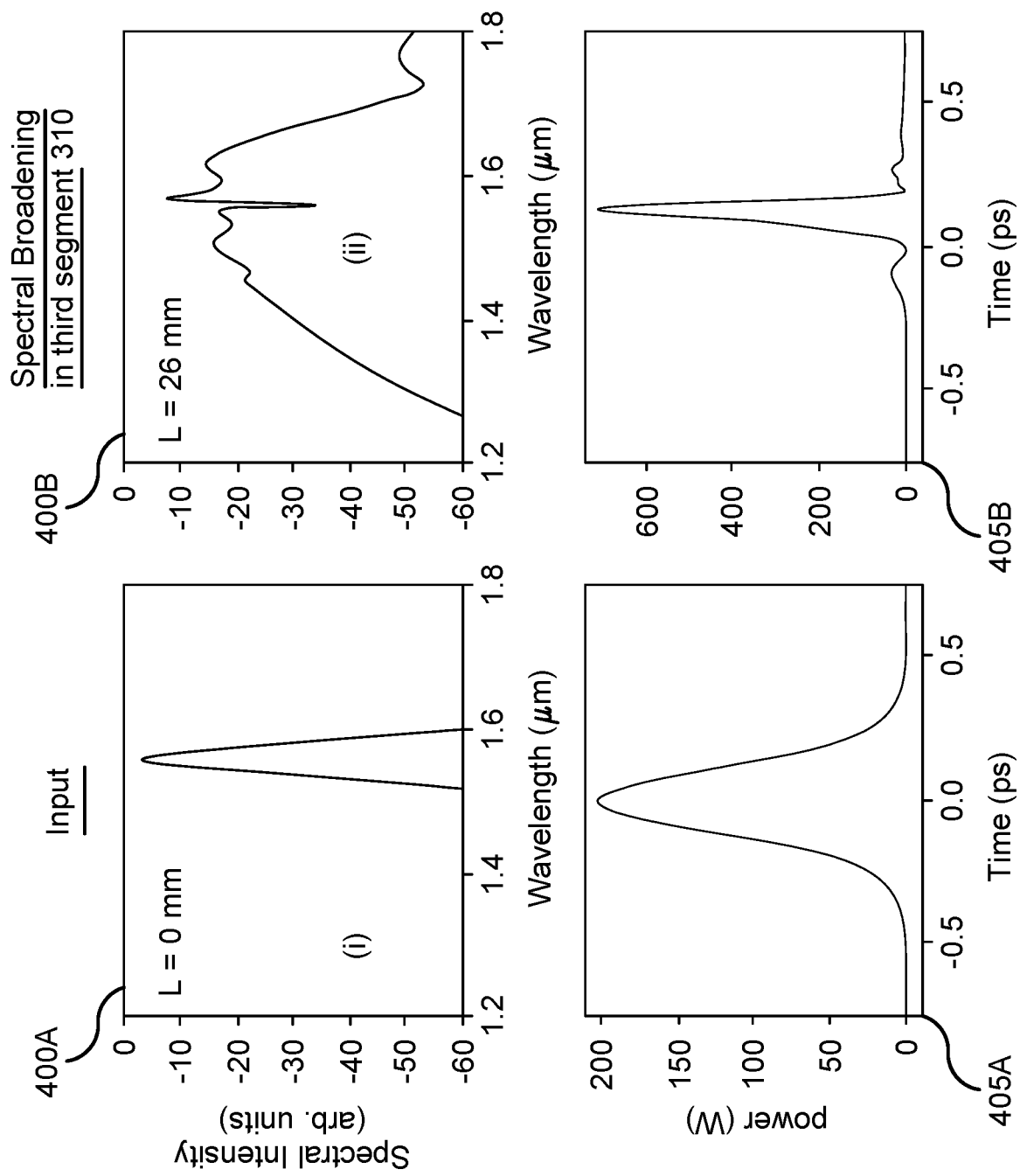
FIG. 4 includes charts illustrating how a frequency comb is changed by the pulse compression waveguide and the supercontinuum generation waveguide in FIG. 3, according to one embodiment described herein.
Figure 4:
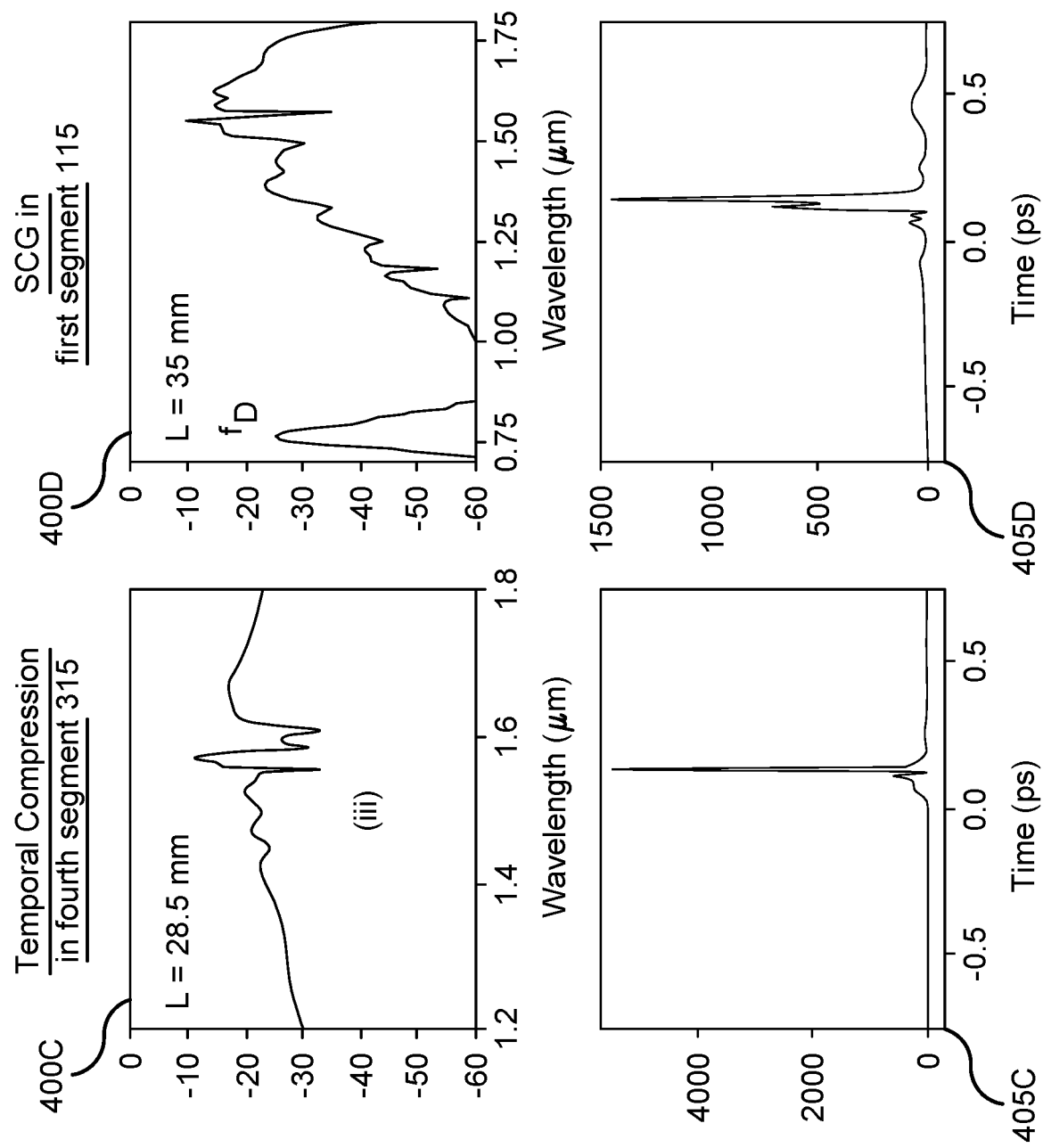
Figure 4:
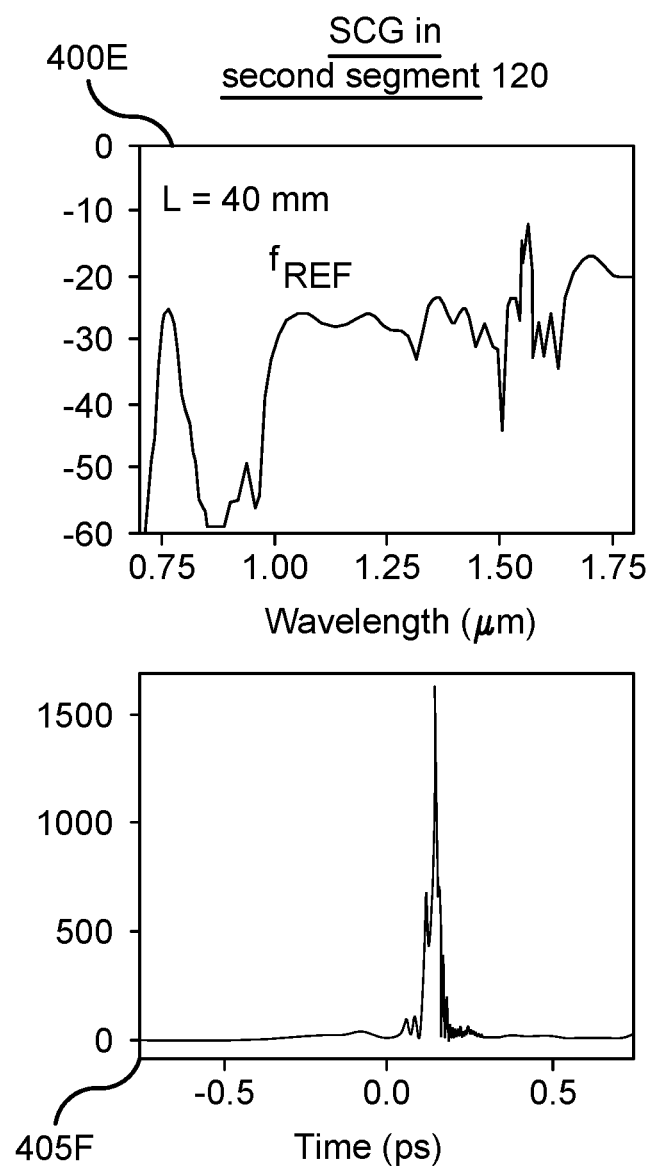

FIG. 4 includes charts illustrating how a frequency comb is changed by the PCW and the SGW in FIG. 3, according to one embodiment described herein. The charts 400A-E illustrate the frequency distribution of the spectral intensity of the frequency comb 105 while the charts 405A-E illustrate the temporal distribution of each pulse in the frequency comb 105.

Chart 400A illustrates the frequency spectrum of the frequency comb 105 when it first enters into the PIC 100. As shown, the frequency spectrum is centered around 1560 nm (+/−approximately 25 nm). Thus, essentially all of the spectral intensity of the frequency comb 105 is between 1535 nm and 1585 nm.

Chart 405A illustrates the temporal distribution of a particular pulse in the frequency comb 405 when it first enters the PIC 100. As shown, the pulse has a width of approximately 250-500 femtoseconds. As discussed above, if the pulse width can be shrunk, this will increase the peak intensity of the pulse, which can in turn increase the signal-to-noise ratio of a measured signal and/or reduce the amount of amplification that is needed when amplifying the frequency comb 105.

The third segment 310 exhibits normal group-velocity dispersion near 1560 nm and provides nonlinear spectral broadening. As a result, the temporal duration of the pulse is shortened, as shown in the time domain representation in chart 405B. Segment 310 uses normal dispersion waveguides to mitigate modulation instability noise that is deleterious for coherent supercontinuum generation used for frequency comb stabilization.

The fourth segment 315 exhibits anomalous group-velocity dispersion (opposite of the third segment 310) and serves to shorten the pulse duration that simultaneously provides further spectral broadening as shown in chart 400C. The short pulse has kilowatt level peak power, as shown in chart 405C, to drive the supercontinuum generation in the subsequent SGW segments.

Chart 400D illustrates the frequency spectrum of the frequency comb 105 after passing through the first segment 115 of the SGW 110. As shown, the spectral intensity has been spread out to other frequencies. While the frequency spectrum in the chart 400B was between 1250 nm to 1800 nm, the first segment 115 increases the frequency spectrum of the comb from 700 nm to 1800 nm. As a result, the frequency comb 105 now contains teeth that are an octave apart.

As shown in chart 400D, a substantial portion of the intensity of the frequency comb 105 is still located at or near 1560 nm; however, another substantial portion of the intensity is now at 780 nm which corresponds to a frequency ($f_D$) that is double the original frequency ($f_{ORG}$) of the original frequency comb 105. In this case, the first segment 115 moves some of the spectral intensity of the frequency comb to 780 nm while keeping some of the spectral intensity of the comb 105 at the original frequency corresponding to 1560 nm. These portions of the frequency comb can be compared to each other (after the 1560 nm light is frequency doubled) to generate a first beat note for stabilizing the frequency comb.

The chart 405D illustrates that the duration of the pulses in the frequency comb 105 is not substantially changed when performing supercontinuum generation in the first segment 115.

Chart 400E illustrates the frequency spectrum of the frequency comb 105 after passing through the second segment 120 of the SGW 110. As shown, a substantial portion of the spectral intensity of the frequency comb 105 is now at the same wavelength or frequency ($f_{REF}$) of the reference laser. Thus, as described later, this portion of the frequency comb can be compared to the reference laser to generate a second beat note for stabilizing the frequency comb.

The charts 400D and 400E are similar to the charts 200B and 200C.

The chart 405F illustrates that the duration of the pulses in the frequency comb 105 is not substantially changed when performing supercontinuum generation in the second segment 120.

Figure 5A:
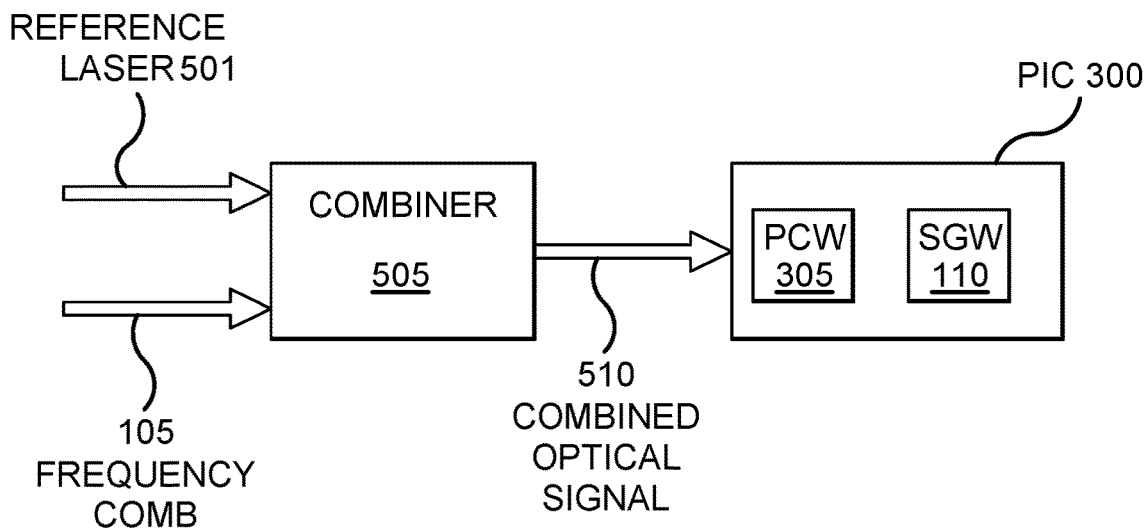
FIGS. 5A and 5B illustrate combining the frequency comb with a reference laser before performing supercontinuum generation, according to one embodiment described herein.
Figure 5B:
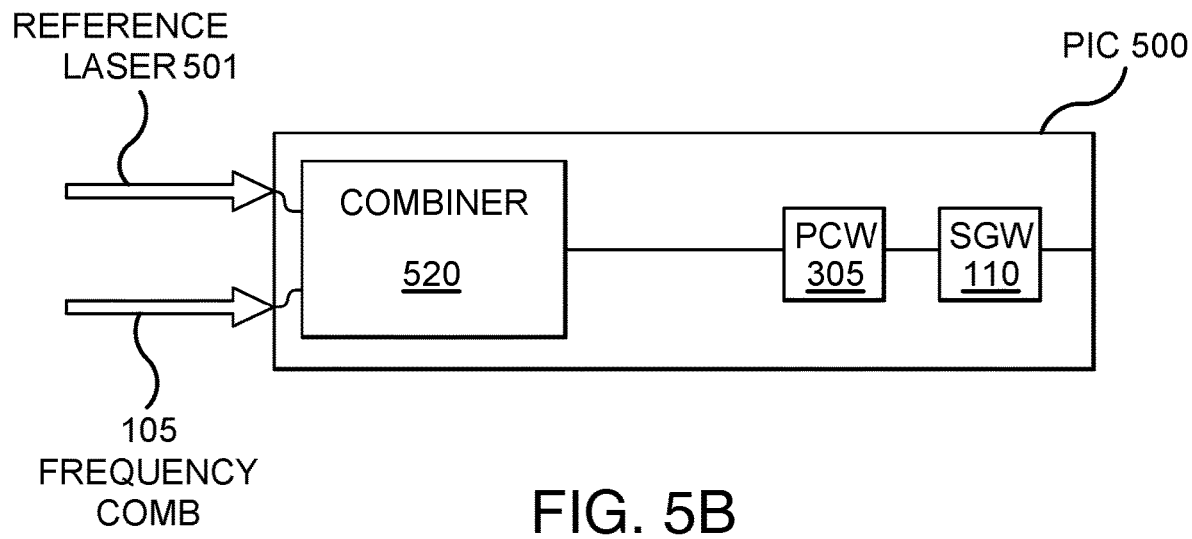

FIGS. 5A and 5B illustrate combining the frequency comb 105 with a reference laser 501 before performing supercontinuum generation, according to one embodiment described herein. In FIG. 5A, the frequency comb 105 is generated by a mode-locked laser. However, the embodiments herein are not limited to any particular technique for generating the frequency comb.

In one embodiment, a first optical fiber transmits the reference laser 501 from a laser source (e.g., a laser source stabilized to an atomic or optical reference) to a combiner 505 while a second optical fiber transmits the frequency comb 105 to the combiner 505. In this embodiment, the combiner 505 is separate from the PIC 300 that includes the PCW 305 and the SGW 110. That is, the combiner 505 can be a separate optical component that optically combines the reference laser 501 and the frequency comb 105.

In one embodiment, the combiner 505 is a wavelength division multiplexer (WDM). The WDM can be an off-the-shelf optical component. For example, the wavelength/frequency of the reference laser 501 and the frequency comb 105 may share the same wavelength/frequency of telecommunication signals. For example, the 1064 nm and the 1550 nm wavelengths are often used in the telecommunication industry. Thus, if the reference laser 501 and the frequency comb 105 are at these wavelengths, a commercial WDM used in telecommunications can be used to combine the reference laser and the frequency comb. This can greatly reduce cost. In another example, the combiner 505 could be a fiber optic combiner.

In another embodiment, the combiner 505 is another PIC, which is separate from the PIC 300. This PIC may include an optical combiner which has two waveguides that merge into one waveguide (e.g., a Y splitter/or on-chip WDM). This PIC, in contrast to the PIC 300, may be a photonic platform that is similar to the cores in the optical fibers that carry the reference laser 501 and the frequency comb 105 (e.g., glass). As such, the mode size of the waveguides in the PIC may be the same as (or very similar to) the mode size of the optical fibers. This makes aligning the optical fibers to the PIC forming the combiner 505 much easier than aligning fibers to the PIC 300 which may have waveguides with much smaller mode sizes.

Combining the optical signal using the combiner 505 can include aligning their direction of propagation, optical mode, and polarization. The combiner 505 outputs a combined optical signal 510 that is a combination of the reference laser 501 and the frequency comb 105. The combiner 505 can then transfer this optical signal to the PIC 300 using either an optical fiber or via free space.

FIG. 5B is block diagram of combining a reference laser and a frequency comb before performing supercontinuum generation, according to one embodiment described herein. Like in FIG. 5A, a first optical fiber can transmit the reference laser 501 to a combiner 520 while a second optical fiber transmits the frequency comb 105 to the combiner 520. In this embodiment, the combiner 520 is part of a PIC 500. That is, the combiner 520 is integrated into the same PIC 500 that also includes the PCW 305 and the SGW 110. Put differently, combining the reference laser and the frequency comb is performed in the same PIC 500 that performs pulse compression and supercontinuum generation, unlike in FIG. 5A where the optical signals are combined in a separate optical component.

While FIGS. 5A and 5B illustrate using PICs with both PCW 305 and SGW 110, in other implementations these PICs may not have PCWs 305, like the PIC 100 in FIG. 1.

Combining the reference laser 501 and the frequency comb 105 as shown in FIGS. 5A and 5B to the same waveguide simplifies obtaining the heterodyne (beat) signals, reduces linear loss, and provides a high signal-to-noise ratio beat signal through implicit mode-matching by the waveguide of the PIC. Another non-limiting advantage includes providing spatial mode filtering by the waveguide when both sources are at the input in the same fiber which eliminates any mode-matching optics at the output. Moreover, polarization-maintaining optical fibers and waveguide can be used to ensure co-polarized light sources. By combining the signals before performing supercontinuum generation, another non-limiting advantage includes using all the comb light and all the reference laser light as opposed to a 90:10 or 50:50 coupler at the output of supercontinuum generation.

Figure 8:
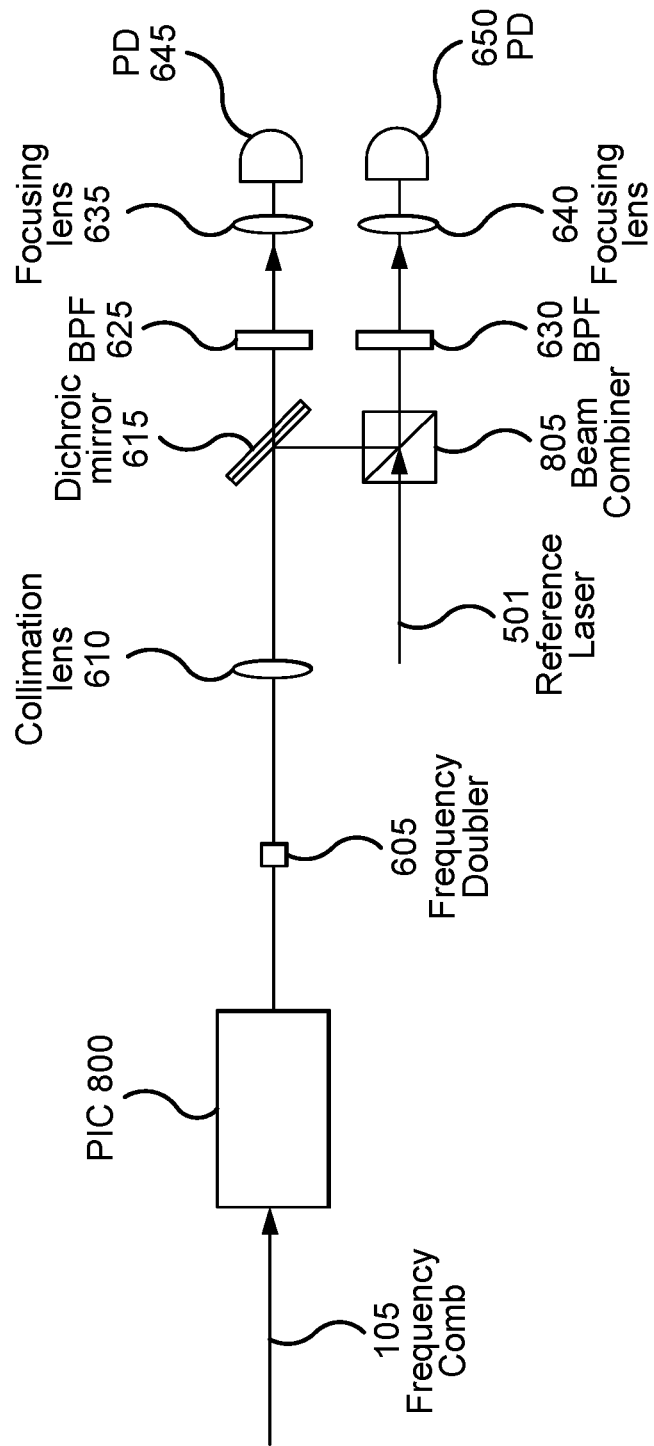
FIG. 8 illustrates generating electrical signals for stabilizing a frequency comb to a reference signal, according to one embodiment described herein.

However, as shown in FIGS. 1 and 3, in other embodiments the reference laser 501 and the frequency comb 105 may not be combined before performing supercontinuum generation. The reference laser 501 can be combined with the frequency comb 105 after super continuum generation is performed. For example, the reference laser 501 can be combined on the PIC after the frequency comb 105 has passed through the SGW 110. In this case, the output of the SGW 110 and the reference laser 501 can be coupled to inputs of an optical combiner in the PIC (such as the combiner 520) where the output of the combiner serves as the output of the PIC. In yet another embodiment, the reference laser 501 can be combined with the frequency comb 105 off the PIC. One example of this embodiment is shown in FIG. 8 below.

Figure 6:
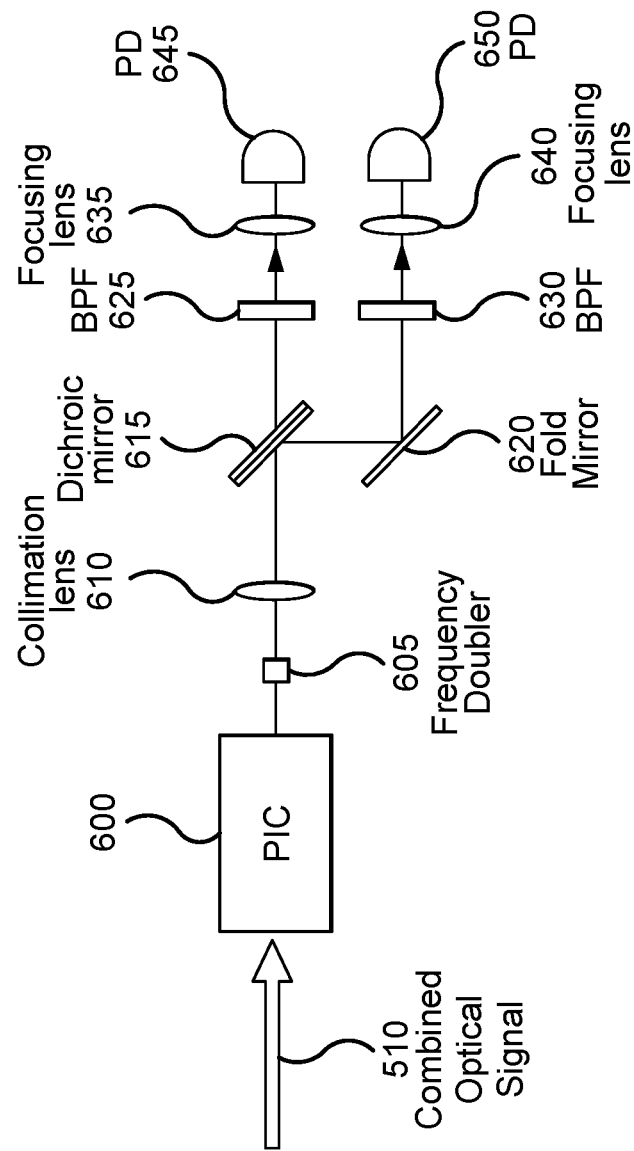
FIG. 6 illustrates generating electrical signals for stabilizing a frequency comb to a reference signal, according to one embodiment described herein.

FIG. 6 illustrates generating electrical signals for stabilizing a frequency comb to a reference signal, according to one embodiment described herein. For ease of explanation, FIG. 6 assumes that the reference laser and the comb have been combined using one of the embodiments above to form the combined optical signal 510 as shown in FIG. 5A. However, the structure in FIG. 6 can also be used if the reference laser and the frequency comb are combined on the PIC 600 as shown in FIG. 5B. It is further assumed the PIC 600 has a SGW, but can also include a PCW.

The output of the PIC 600 can include the frequency comb which has substantial intensity at its original frequency (e.g., 1560 nm), a doubled frequency (e.g., 780 nm), and the frequency of the reference laser (e.g., 1064 nm) as a result of passing through a two-segment SGW. This is shown in the charts 200C and 400E above. The output of the PIC 600 also includes the reference laser (e.g., at 1064 nm).

These optical signals pass through the frequency doubler 605 which is designed to frequency double only the portion of the output signal that is at the original frequency of the frequency comb (e.g., 1560 nm). That is, the portion of the frequency comb at 1064 nm and at 780 nm, and the reference laser, pass through the frequency doubler 605 without being affected. However, the portion of the frequency comb that is at 1560 nm is shifted to 780 nm (e.g., its frequency is doubled). Thus, the optical signal exiting the frequency doubler 605 now has two different optical signals at 780 nm: a first optical signal resulting from performing supercontinuum generation on the frequency comb by the first segment 115 in FIG. 1, and a second optical signal resulting from frequency doubling the portion of the frequency comb that was at 1560 nm using the frequency doubler 605. In total, the optical signal exiting the frequency doubler 605 can be considered as having four optical signals of importance: a portion of the intensity of the frequency comb at 780 nm generated by supercontinuum generation, a portion of the intensity of the frequency comb at 780 nm generated by the frequency doubler 605, a portion of the intensity of the frequency comb at 1064 nm generated by supercontinuum generation, and the reference laser at 1064 nm. Thus, two of these signals are at 780 nm, while the other two are at 1064 nm. The rest of the spectrum is rejected by band-pass filters 625 and 630.

The frequency doubler 605 can be implemented using any material (e.g., birefringent crystal) that can frequency double the original frequency of the frequency comb. One suitable crystal for a 1560 nm optical signal is periodically poled lithium niobate (PPLN). But the type of crystal (or its dimensions) can vary depending on the frequency of the frequency comb.

A collimating lens 610 collimates the optical signals before they are then separated by a dichroic mirror 615. For example, the dichroic mirror 615 may have a cut-off wavelength at 1000 nm so that the two optical signals at 780 nm pass through the dichroic mirror 615 while the two optical signals at 1064 nm are reflected by the mirror 615.

The two optical signals at 780 nm pass through a band pass filter (BPF) 625 that filters out all other signals that are not near 780 nm. For example, the chart 400E illustrates that some of the intensity of the frequency comb is spread out at signals other than the desired frequencies of 780 nm and 1064 nm. The BPF 625 can mitigate or remove the optical signals at the undesired frequencies, thereby aiding higher signal-to-noise measurements of the beatnotes.

The filtered optical signals are then focused by the focusing lens 635 and detected by a PD 645. For example, the PD 645 may be a silicon PD 645 since this material can detect optical signals near 780 nm. The electrical signal generated by the PD 645 is a beat between the portion of the frequency comb that was spectrally extended by performing supercontinuum generation and the portion of the frequency comb that was frequency doubled by the frequency doubler 605. This first beat note can then be used to identify the $f_{CEO}$ in Equation 1 above to stabilize the frequency comb.

The two optical signals at 1064 nm are reflected by a fold mirror 620 and filtered using a BPF 630 which blocks optical signals that are not close to 1064 nm. The filtered optical signals are then focused by the focusing lens 640 onto a PD 650. For example, the PD 650 may be an InGaAs PD 650 since this material can detect optical signals near 1064 nm. The electrical signal generated by the PD 650 is a second beat note between the portion of the frequency comb that was shifted to 1064 nm by performing supercontinuum generation and the reference signal. This beat note can then be used to stabilize a second degree of freedom for the frequency comb, which yields a stabilized free as in Equation 1.

In this manner, one PIC 600 can be used to generate two beat notes that are then used to fully stabilize a frequency comb.

Figure 7:
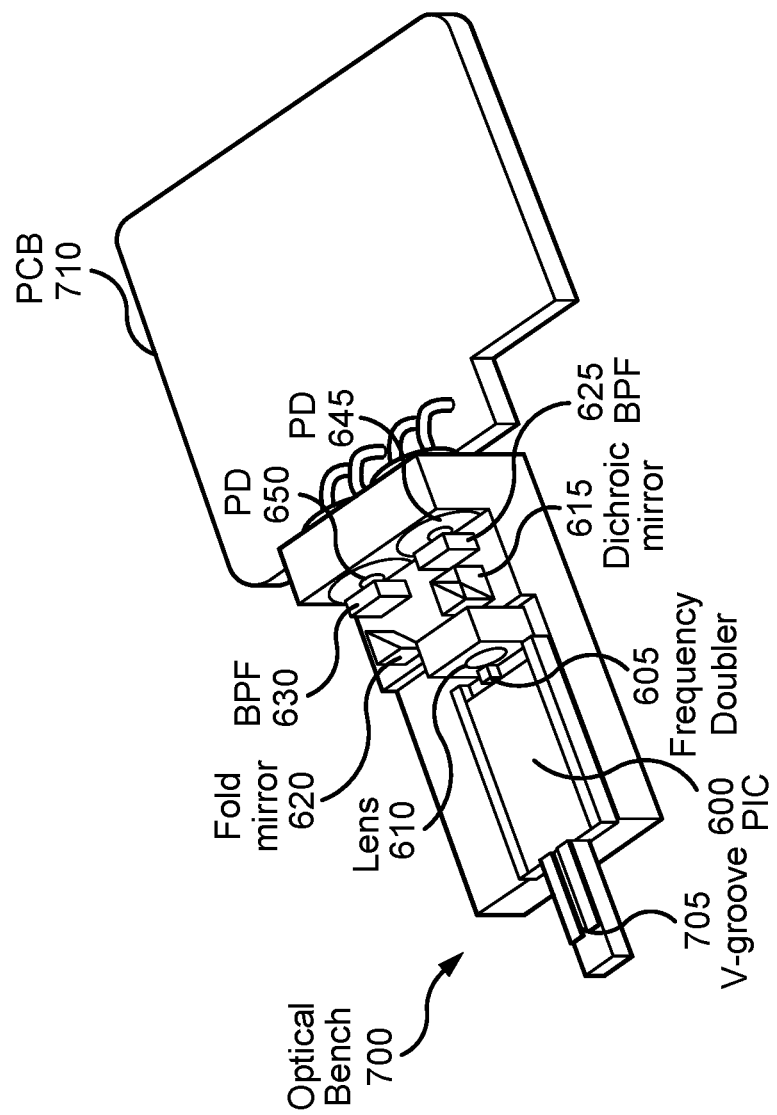
FIG. 7 illustrates an optical bench for the components in FIG. 6, according to one embodiment described herein.

FIG. 7 illustrates an optical bench 700 for the components in FIG. 6, according to one embodiment described herein. As shown, the optical bench 700 includes a surface on which the PIC 600 is mounted. The bench 700 also includes a V-groove 705 to align an optical fiber transmitting the combined optical signal to the PIC 600.

As discussed above, the PIC 600 outputs optical signals that pass through the frequency doubler 605 which is designed to frequency double only the portion of the output signal that is at the original frequency of the frequency comb (e.g., 1560 nm). That is, the portion of the frequency comb at 1064 nm and at 780 nm, and the reference laser, pass through the frequency doubler 605 without being affected.

These optical signals (e.g., two optical signals at 1064 nm and two optical signals at 780 nm) are then collimated by the lens 610. The dichroic mirror 615 splits the pairs of optical signals as discussed above. Two of the optical signals are reflected by the fold mirror 620, filtered by the BPF 630, and then detected by the PD 650. The other two of the optical signals pass through the dichroic mirror 615, are filtered by the BPF 625 and are detected by the PD 645.

The optical bench 700 supports and aligns these optical components. For example, during active alignment, the PIC 600 can be moved on the surface of the optical bench 700 until optical signals are detected by the PDs 645 and 650. The PIC 600 can then be epoxied into place on the optical bench 700.

In this example, the PDs 645 and 650 are electrically connected to a printed circuit board (PCB) 710. The PCB 710 can be coupled to a computing device that detects the beats or beat notes generated by the PDs 645 and 650 and adjusts the actuators of the mode-locked laser to lock the frequency comb to the reference laser.

FIG. 8 illustrates generating electrical signals for stabilizing a frequency comb to a reference signal, according to one embodiment described herein. Unlike in FIG. 6 where the frequency comb and the reference laser are combined before supercontinuum generation is performed, FIG. 8 illustrates combining a portion of the frequency comb 105 with the reference laser 501 after supercontinuum generation has been performed.

In this example, a PIC 800 receives the frequency comb 105 (but not the reference laser 501). It is further assumed the PIC 800 has a SGW, and can also include a PCW. The output of the PIC 800 can include a first portion of the frequency comb 105 which has substantial intensity at its original frequency (e.g., 1560 nm), a second portion of the frequency comb 105 that is shifted to twice the original frequency (e.g., 780 nm), and a third portion of the frequency comb 105 at the frequency of the reference laser (e.g., a wavelength of 1064 nm) as the result of passing through a two-segment SGW.

These optical signals pass through the frequency doubler 605 which is designed to frequency double only the portion of the output signal that is at the original frequency of the frequency comb (e.g., 1560 nm). That is, the portions of the frequency comb at 1064 nm and at 780 nm pass through the frequency doubler 605 without being affected. However, the portion of the frequency comb that is at 1560 nm is shifted to 780 nm (e.g., its frequency is doubled). Thus, the optical signal exiting the frequency doubler 605 now has two different optical signals at 780 nm: a first optical signal resulting from performing supercontinuum generation on the frequency comb by the first segment 115 in FIG. 1, and a second optical signal resulting from frequency doubling the portion of the frequency comb that was at 1560 nm using the frequency doubler 605. Thus, after passing through the frequency doubler 605, very little (or substantially none) of the light in the frequency comb may be at 1560 nm. In total, the optical signal exiting the frequency doubler 605 can be considered as having three optical signals: a portion of the intensity of the frequency comb at 780 nm generated by supercontinuum generation, a portion of the intensity of the frequency comb at 780 nm generated by the frequency doubler 605, and a portion of the intensity of the frequency comb at 1064 nm generated by supercontinuum generation. Thus, two of these signals are at 780 nm, while the other one is at 1064 nm.

These optical signals are collimated by the lens 610 and then split by the dichroic mirror 615 such that the two optical signals at 780 nm are transmitted to the BPF 625 where they are filtered and then focused by the lens 635 and detected by the PD 645. The resulting electrical signal creates a first beat note as discussed above.

The third optical signal is reflected by the dichroic mirror 615 to a beam combiner 805 which combines the reference laser 501 with the portion of the frequency comb 105 at the same frequency (e.g., 1064 nm). These optical signals are then filtered by the BPF 630 and focused by the lens 640 onto the PD 650. The resulting electrical signal creates a second beat note as discussed above.

Figure 9:
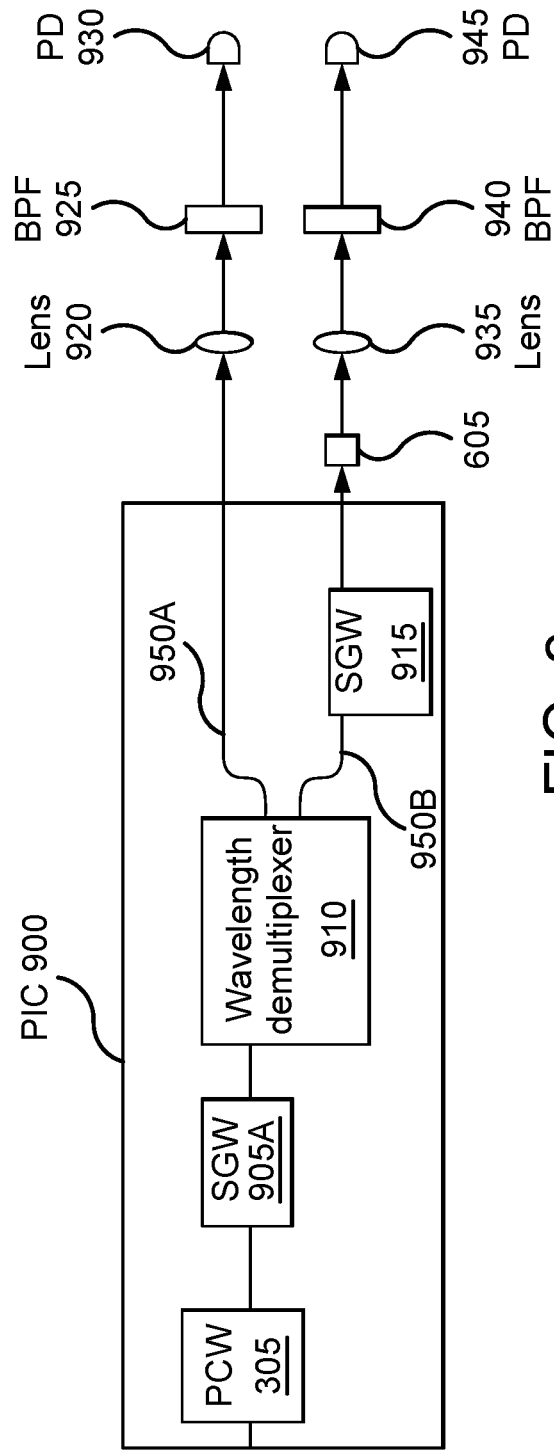
FIG. 9 illustrates a PIC with an integrated wavelength demultiplexer, according to one embodiment described herein.

FIG. 9 illustrates a PIC 900 with an integrated wavelength demultiplexer 910, according to one embodiment described herein. FIG. 9 assumes that the reference laser and the frequency comb have been combined using one of the embodiments above to form the combined optical signal 510 as shown in FIG. 5A. However, the structure in FIG. 9 can also be used if the reference laser and the frequency comb are combined on the PIC 900 as shown in FIG. 5B. Further, the PIC 900 includes a PCW 305, but this is optional.

Rather than having a two-segment SGW as shown in FIGS. 1 and 3, the super continuum generation in PIC 900 is performed using two discontinuous SGW segments—i.e., SGW segments 905 and 915. In one embodiment, the first SGW segment 905 performs super continuum generation to move some of the intensity of the frequency comb to the same wavelength as the reference laser (e.g., 1064 nm). For example, the first SGW segment 905 can have a design like the second SGW segment 120 in FIG. 1 which spreads the spectrum of the frequency comb 105 so that it includes the frequency/wavelength of the reference laser. Thus, the output of the first SGW 905 includes three optical signals: a portion of the frequency comb at the original frequency (e.g., 1560 nm), a portion of the frequency comb at the reference laser wavelength (e.g., 1064 nm), and the reference laser signal itself (e.g., 1064 nm).

The integrated wavelength demultiplexer 910 can have a cut-off wavelength that separates the two optical signals at the reference wavelength frequency from the portion of the frequency comb still at the original frequency. The reference laser and the portion of the frequency comb at the wavelength of the reference laser are coupled into an upper waveguide 950A. These optical signals exit the PIC 900, are collimated by a lens 920, filtered by the BPF 925 to remove undesired frequencies, and then detected at a PD 930 to generate a first beat note.

The portion of the frequency comb still at the original frequency is coupled by the wavelength demultiplexer 910 into a lower waveguide 950B to reach the second SGW segment 915. The SGW segment 915 is designed to perform supercontinuum generation to move some of the intensity of the frequency comb to twice the frequency of the original frequency (e.g., 780 nm). For example, the first SGW 915 can have a design like the first segment 115 in FIG. 1 which spreads the spectrum of the frequency comb 105 so that it includes a substantial portion of the light at twice the frequency.

This optical signal exits the PIC 900 and is then frequency doubled by the frequency doubler 605, as discussed above. Thus, at the output of the frequency doubler 605 there are two optical signals: a portion of the frequency comb that was extended to twice the original frequency using supercontinuum generation and a portion of the frequency comb that was frequency doubled using the frequency doubler 605. These optical signals are collimated by the lens 935, filtered by the BPF 940 to remove undesired frequencies, and then detected by the PD 945 to generate a second beat note.

In this manner, the wavelength demultiplexer 910 can be integrated into the PIC 900. Further, the supercontinuum generation can be performed using two separate or discontinuous SGW segments. The resulting optical system may have a smaller footprint and use fewer bulk optics than the system in FIG. 8.

Figure 10:
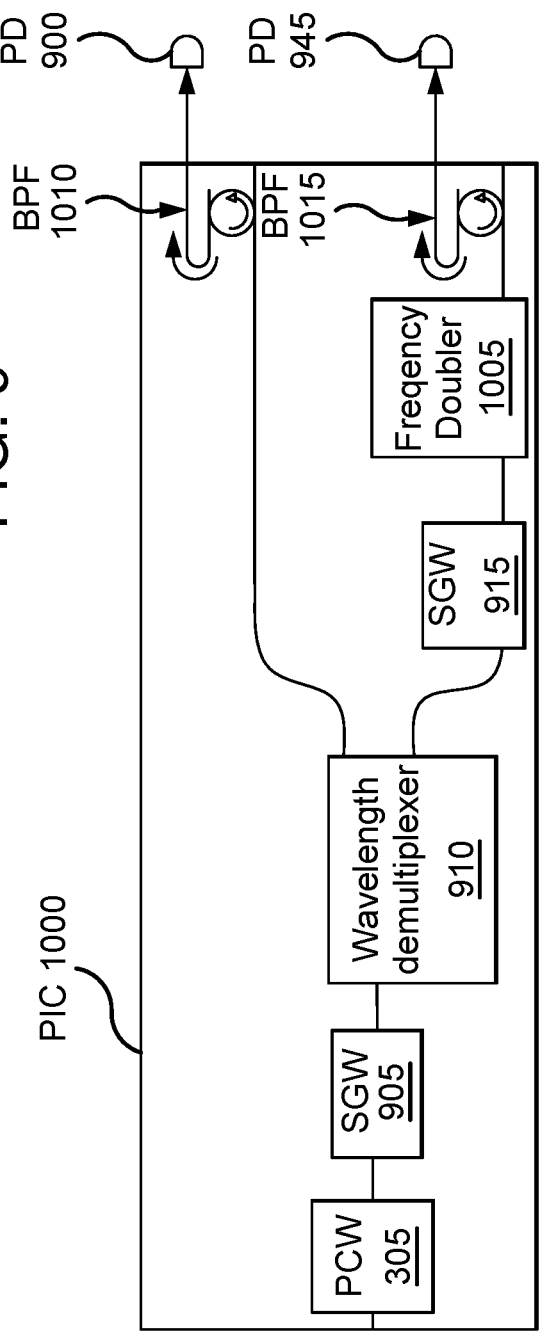
FIG. 10 illustrates a PIC with integrated band pass filters, according to one embodiment described herein.

FIG. 10 illustrates a PIC 100 with integrated band pass filters, according to one embodiment described herein. Like the PIC 900 in FIG. 9, the PIC 1000 includes a PCW, the first SGW segment 905 for spreading the spectrum of the frequency comb to include the frequency of the reference laser, the wavelength demultiplexer 910 to separate the portion of the frequency comb at the original frequency from both the reference laser and the portion of the frequency comb at the same frequency as the reference laser, and the second SGW segment 915 to spread the spectrum of the frequency comb to twice its original frequency.

In addition, the PIC 1000 includes an integrated frequency doubler 1005 for frequency doubling a portion of the frequency comb that is still at the original frequency (e.g., 1560 nm). In one embodiment, the PIC 1000 is made from a material that supports second-order nonlinearity that can frequency double, such as lithium niobate. For example, the frequency doubler 1005 can be a specially designed waveguide for frequency doubling. Thus, the output of the frequency doubler 1005 includes at least two optical signals: a portion of the frequency comb that was extended to twice the original frequency using supercontinuum generation and a portion of the frequency comb that was frequency doubled using the frequency doubler 1005.

The PIC 1000 also includes integrated BPFs 1010 and 1015 for filtering the respective pairs of optical signals to remove undesired frequencies. The BPFs 1010 and 1015 can be microresonators or arrayed waveguide gratings. The filtered signals are then detected by the PDs 930 and 945 to generate the two beat notes.

In this manner, the frequency doubler 1005 and the BPFs 1010 and 1015 can be integrated into the PIC 1000. The resulting optical system may have a smaller footprint and uses fewer bulk optics than the systems in FIGS. 8 and 9.

In another embodiment, instead of using two separate SGW segments 905 and 915 as shown, the two-segment SGW 110 illustrated in FIG. 1 could be used. In that case, the frequency doubler 1005 can be disposed after the SGW 110 and before the wavelength demultiplexer 910. Thus, the output of the frequency doubler 1005 would be four optical signals: a portion of the intensity of the frequency comb at 780 nm generated by supercontinuum generation, a portion of the intensity of the frequency comb at 780 nm generated by the frequency doubler 605, a portion of the intensity of the frequency comb at 1064 nm generated by supercontinuum generation, and the reference laser at 1064 nm. In that example, the wavelength demultiplexer 910 could have a cut-off around 1000 nm so the optical signals with wavelengths at 780 nm would be transmitted to the BPF 1010 while the optical signals with wavelengths at 1064 nm would be transmitted to the BPF 1015.

Figure 11A:
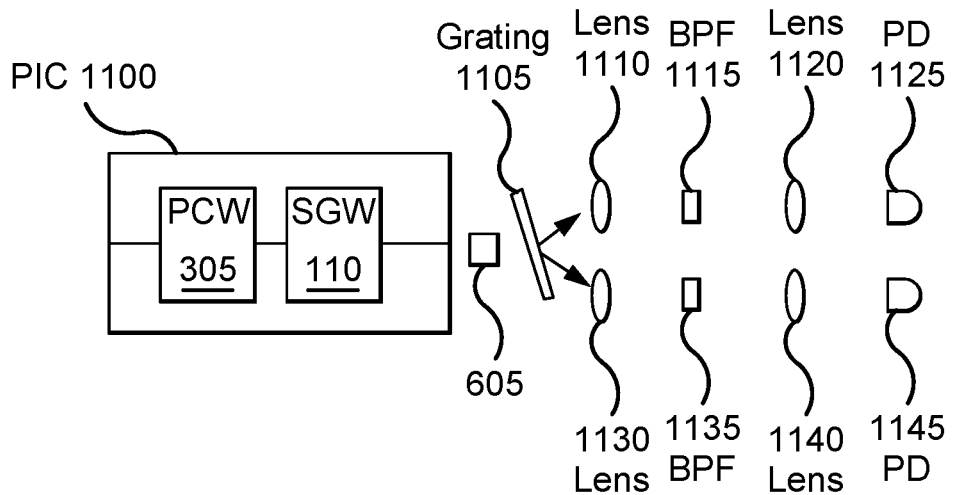
FIGS. 11A and 11B illustrate using gratings to direct optical signals to respective photodiodes, according to one embodiment described herein.
Figure 11B:
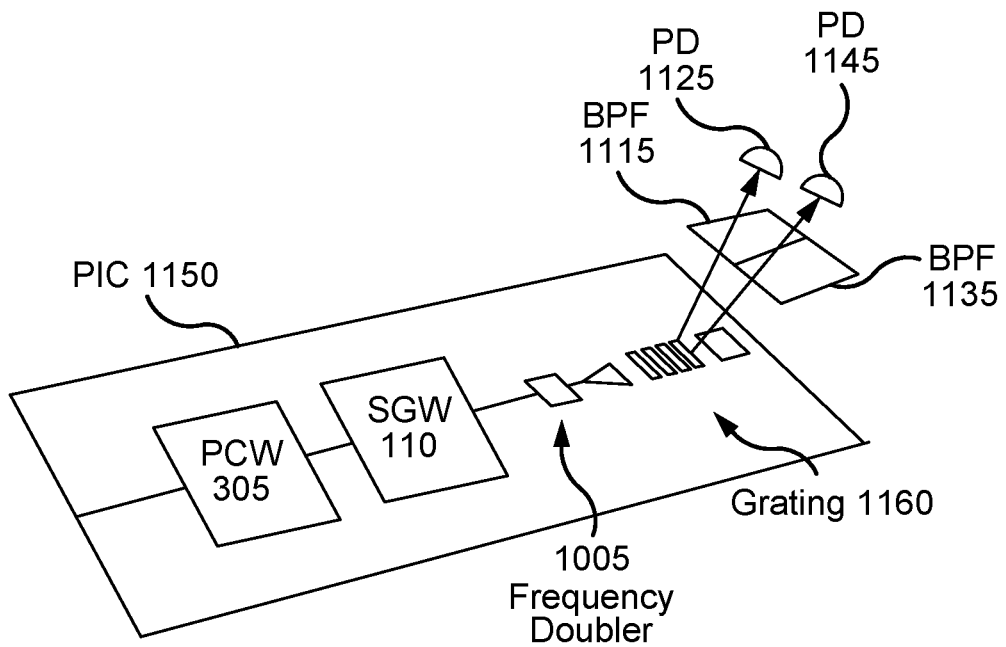

FIGS. 11A and 11B illustrate using gratings to direct optical signals to respective photodiodes, according to one embodiment described herein. For ease of explanation, FIGS. 11A and 11B assumes that the reference laser and the comb have been combined using one of the embodiments above to form the combined optical signal 510 as shown in FIG. 5A. However, the structure in FIGS. 11A and 11B can also be used if the reference laser and the frequency comb are combined on the PIC as shown in FIG. 5B.

The PIC 1100 in FIG. 11A includes the PCW 305 and the SGW 110 which outputs three optical signals: a portion of the intensity of the frequency comb at 780 nm generated by supercontinuum generation, a portion of the intensity of the frequency comb at 1064 nm generated by supercontinuum generation, and the reference laser at 1064 nm.

The PIC 1100 transmits these signals to a frequency doubler 605 which selectively frequency doubles the portion of the frequency comb at the original frequency (e.g., from 1560 nm to 780 nm). Thus, the frequency doubler 605 outputs four optical signals: a portion of the frequency comb at 780 nm generated by supercontinuum generation, a portion of the frequency comb at 780 nm generated by the frequency doubler 605, a portion of the frequency comb at 1064 nm generated by supercontinuum generation, and the reference laser at 1064 nm.

A grating 1105 can separate the optical signals according to their wavelength/frequency. That is, the grating 1105 transmits light at different angles depending on its frequency. Thus, the portions of the frequency comb at 780 nm are transmitted in a different direction than the portion of the frequency comb and the reference laser at 1064 nm. The grating 1105 can be arranged so that the portions of the frequency comb at 780 nm are received by lens 1110 while the portion of the frequency comb and the reference laser at 1064 nm are received by the lens 1130.

The lenses 1110 and 1130 collimate the received optical signals, which are then filtered to remove undesired frequencies by the BPFs 1115 and 1135. The Lenses 1120 and 1140 then focus these optical signals onto the PDs 1125 and 1145 to generate the two beat notes as discussed above.

Advantageously, FIG. 11A can use a single grating 1105 to separate the optical signals at 780 nm from the optical signals at 1064 nm, in contrast to FIG. 6 or 8 which use multiple bulk optical components to separate these optical signals.

In another embodiment, a double bandpass filter could be disposed before the grating 1105 to filter the optical signal. In that case, the two bandpass filters 1115 and 1135 could be omitted.

The PIC 1150 in FIG. 11B is based on a platform that supports second order nonlinearities and includes the PCW 305 and the SGW 110 which outputs three optical signals: a portion of the frequency comb at 780 nm generated by supercontinuum generation, a portion of the frequency comb at 1064 nm generated by supercontinuum generation, and the reference laser at 1064 nm. The on-chip frequency doubler 1005 can frequency double a portion of the frequency comb at the original frequency. As such, the frequency doubler 1005 outputs four optical signals: a portion of the frequency comb at 780 nm generated by supercontinuum generation, a portion of the frequency comb at 780 nm generated by the frequency doubler 605, a portion of the frequency comb at 1064 nm generated by supercontinuum generation, and the reference laser at 1064 nm.

A vertical surface grating 1160 can separate the optical signals according to their wavelength/frequency. That is, the grating 1160 diffracts light at different angles depending on its frequency. However, the grating 1160 is integrated into the PIC 1150, unlike the grating 1105 in FIG. 11A. In another embodiment, an in-plane grating (e.g., an arrayed waveguide grating) could be integrated into the PIC 1150 to diffract light at different angles depending on its frequency. In this case, the BPFs 1115 and 1135 can be edge coupled to the PIC 1150 to receive the diffracted light.

The portions of the frequency comb that have wavelengths at 780 nm are transmitted through the BPF 1115 and detected by the PD 1125 while the portion of the frequency comb and the reference laser that have wavelengths at 1064 nm are transmitted through the BPF 1135 and detected by the PD 1145.

Figure 12:
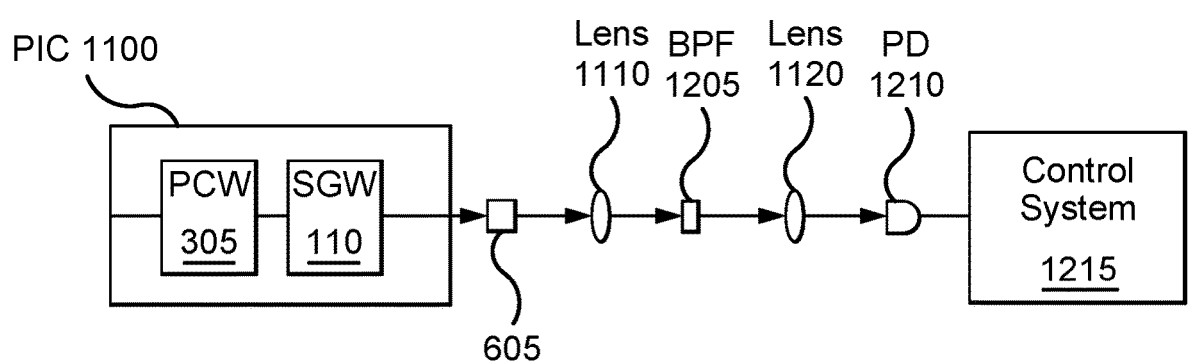
FIG. 12 illustrates using one photodiode to detect two optical signals at different wavelengths, according to one embodiment described herein.

FIG. 12 illustrates using one PD 1210 to detect two optical signals at different wavelengths, according to one embodiment described herein. For ease of explanation, FIG. 12 assumes that the reference laser and the comb have been combined using one of the embodiments above to form the combined optical signal 510 as shown in FIG. 5A. However, the structure in FIG. 12 can also be used if the reference laser and the frequency comb are combined on the PIC as shown in FIG. 5B.

The PIC 1100 in FIG. 12 includes the PCW 305 and the SGW 110 which outputs three optical signals: a portion of the frequency comb at 780 nm generated by supercontinuum generation, a portion of the frequency comb at 1064 nm generated by supercontinuum generation, and the reference laser at 1064 nm.

The PIC 1100 transmits these signals to a frequency doubler 605 which selectively frequency doubles the portion of the frequency comb at the original frequency (e.g., from 1560 nm to 780 nm). Thus, the frequency doubler 605 outputs four optical signals: a portion of the frequency comb at 780 nm generated by supercontinuum generation, a portion of the frequency comb at 780 nm generated by the frequency doubler 605, a portion of the frequency comb at 1064 nm generated by supercontinuum generation, and the reference laser at 1064 nm.

These four optical signals are then collimated by the lens 1110 and pass through a BPF 1205. However, unlike the embodiments above where the BPFs were designed to filter signals around one wavelength or frequency (e.g., either 1064 nm or 780 nm), the BPF 1205 is designed to filter around two different wavelengths or frequencies (e.g., the BPF 1205 transmits both 1064 nm and 780 nm but blocks everything else). The four filtered signals are then focused by the lens 1120 onto the PD 1210.

In one embodiment, the PD 1210 is a dual color PD with different detection layers. For example, a first detection layer may be designed to detect light at 780 nm (e.g., a silicon layer or GaAs) and a second detection layer designed to detect light at 1064 nm (e.g., an InGaAs layer). Advantageously, the optical system in FIG. 12 avoids separating the 1064 nm optical signals onto a separate optical path from the 780 nm optical signals.

Further, FIG. 12 includes a control system 1215 (e.g., a computing system) for electronically separating the two beat notes generated by the PD 1210. That is, instead of using different optical paths to generate two beat notes, FIG. 12 uses the control system 1215 to electrically separate the beat notes generated by the PD 1210.

Figure 13:
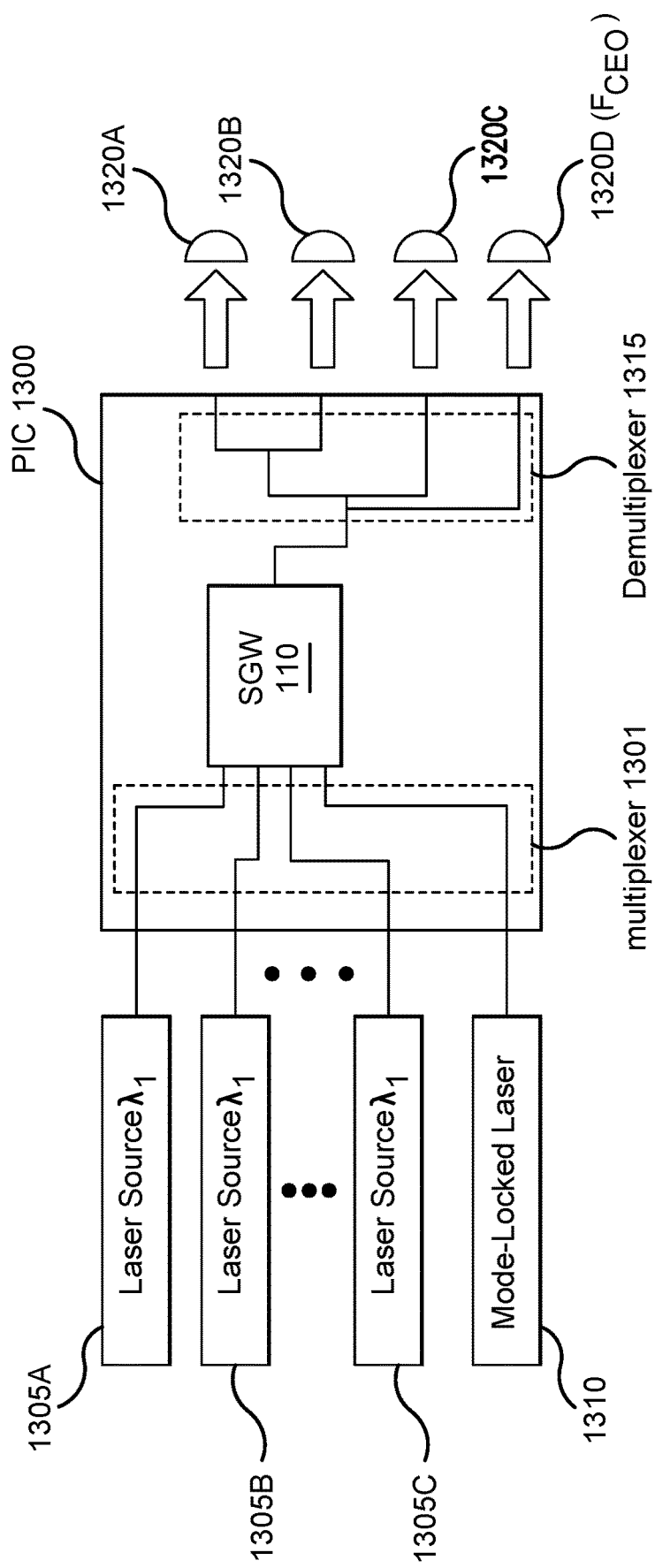
FIG. 13 illustrates combining more than two optical signals, according to one embodiment described herein.

FIG. 13 illustrates combining more than two optical signals, according to one embodiment described herein. As shown, a PIC 1300 receives multiple reference lasers generated by different laser sources referenced to atomic or optical systems 1305A-C along with the frequency comb generated by the mode-locked laser 1310. The reference lasers can be combined with the frequency comb using a multiplexer 1301 which can include, e.g., a plurality of the optical combiners discussed in FIG. 5B. For example, some applications may want to perform a clock comparison of reference lasers generated by different clock systems. Put differently, the reference lasers can each be stabilized by a different laser locking system or technique. The reference lasers can be combined by the PIC 1300, pass through the SGW 110 so that the reference lasers are all within the spectral envelope of the frequency comb, and then split out the signals so their beats relative to a tooth within the frequency comb can be separately measured by the PDs 1320A-D, where PD 1320D detects the beat note associated with $F_{CEO}$. By evaluating the beats, the system can compare the frequency instabilities between the frequency comb and each of the reference lasers.

The PIC 1300 includes a demultiplexer 1315 to split out the signals for the different PDs 1320A-D. That is, the demultiplexer 1315 can separate out various colors on the PIC 1300 to obtain multiple beat notes.

While FIG. 13 illustrates evaluating three reference lasers, the system could instead evaluate the frequency instabilities of two reference lasers, four reference lasers, etc.

In another embodiment, instead of combining the optical signals within the PIC 1300, they could instead be combined using a separate combiner such as a different PIC or a WDM as discussed in FIG. 5A. In that case, only one optical fiber may be aligned to the PIC 1300. Also, instead of directly detecting the four output signals using the PDs 1320A-D, the system could include one or more lenses and the filters discussed in FIGS. 6-11 that filter the optical signals before they are detected by the PDs 1320A-D.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

As will be appreciated by one skilled in the art, the embodiments disclosed herein may be embodied as a system, method, or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A photonic integrated circuit (PIC), comprising:
   an optical interface configured to receive a frequency comb; and
   a supercontinuum generation waveguide (SGW) configured to spread a frequency spectrum of the frequency comb to include a first frequency and a second frequency different from the first frequency, wherein the first and second frequencies are selected for stabilizing a repetition frequency of the frequency comb.

2. The PIC of claim 1, wherein a first segment of the SGW spreads the frequency spectrum of the frequency comb to include the first frequency while a second segment of the SGW spreads the frequency spectrum of the frequency comb to include the second frequency, wherein the first segment abuts the second segment.

3. The PIC of claim 2, wherein a width and length of the first segment is different than a width and length of the second segment.

4. The PIC of claim 3, wherein the first segment is configured to spread the frequency spectrum of the frequency comb so the frequency spectrum includes at least one octave from an original frequency of the frequency comb, and
   wherein the second segment is configured to spread the frequency spectrum of the frequency comb so that the frequency spectrum includes a frequency of a reference laser.

5. The PIC of claim 4, wherein the reference laser is interferometrically combined with the frequency comb before the frequency comb passes through the first and the second segments.

6. The PIC of claim 1, further comprising:
   a pulse compression waveguide (PCW) coupled between the optical interface and the SGW, the PCW configured to compress pulses within the frequency comb.

7. The PIC of claim 6, wherein the PCW comprises a third segment configured to broaden a frequency of the pulses and a fourth segment configured to perform temporal compression, wherein the frequency comb passes through the third segment before passing through the fourth segment.

8. The PIC of claim 7, wherein the PCW comprises a fifth segment configured to pre-shape the pulses after passing through the third and fourth segments.

9. The PIC of claim 1, wherein a first segment of the SGW spreads the frequency spectrum of the frequency comb to include the first frequency while a second segment of the SGW spreads the frequency spectrum of the frequency comb to include the second frequency, wherein the first segment is discontinuous from the second segment.

10. A PIC, comprising:
    an optical interface configured to receive a frequency comb;
    a PCW configured to compress teeth within the frequency comb; and
    a SGW configured to spread a frequency spectrum of the frequency comb to include a first frequency for stabilizing at least one of a carrier-envelope offset (CEO) frequency or a frequency of a comb tooth of the frequency comb to an optical reference.

11. The PIC of claim 10, wherein the SGW comprises a first segment configured to spread the frequency spectrum of the frequency comb to include the first frequency and a second segment configured to spread the frequency spectrum of the frequency comb to include a second frequency different from the first frequency.

12. The PIC of claim 11, wherein the first segment is configured to spread the frequency spectrum of the frequency comb so the frequency spectrum includes at least one octave from an original frequency of the frequency comb, and
    wherein the second segment is configured to spread the frequency spectrum of the frequency comb so that the frequency spectrum includes a frequency of a reference laser.

13. The PIC of claim 12, wherein the reference laser is combined with the frequency comb before the frequency comb passes through the first and the second segments.

14. The PIC of claim 11, wherein the first segment is discontinuous from the second segment.

15. The PIC of claim 11, wherein the PCW comprises a third segment and a fourth segment, wherein the third and fourth segments are configured to broaden a frequency span and perform temporal compression of pulses in the frequency comb.

16. The PIC of claim 15, wherein the PCW comprises a fifth segment configured to pre-shape the pulses after passing through the third and fourth segments.

17. A system, comprising:
    a PIC configured to receive a frequency comb, the PIC comprising:
       a supercontinuum generation waveguide (SGW) configured to spread a frequency spectrum of the frequency comb to include a first frequency and a second frequency different from the first frequency; and
    a frequency doubler coupled to an output of the SGW, the frequency doubler configured to frequency double a portion of the frequency comb at an original frequency.

18. The system of claim 17, wherein the SGW comprises a first SGW segment configured to spread the frequency spectrum of the frequency comb so the frequency spectrum includes the first frequency which is at least one octave from the original frequency of the frequency comb, and
    wherein the SGW comprises a second SGW segment configured to spread the frequency spectrum of the frequency comb to include the second frequency which corresponds to a frequency of a reference laser.

19. The system of claim 18, wherein the frequency doubler is configured to output at least three optical signals: a first portion of the frequency comb at the first frequency generated by the first SGW segment, a second portion of the frequency comb at the first frequency produced by the frequency doubler, and a third portion of the frequency comb at the second frequency generated by the second SGW segment.

20. The system of claim 19, further comprising:
    a wavelength demultiplexer configured to receive the three optical signals and transmit the first and second portions of the frequency comb on a first optical path and transmit the third portion of the frequency comb on a second optical path;
a first band pass filter (BPF) on the first optical path and configured to filter the first and second portions of the frequency comb;
a first photodiode (PD) configured to generate a first beat note based on detecting the first and second portions of the frequency comb after being filtered by the first BPF;
a second BPF on the second optical path and configured to filter the third portion of the frequency comb and the reference laser; and
a second PD configured to generate a second beat note based on detecting the third portion of the frequency comb and the reference laser after being filtered by the second BPF.

21. The system of claim 20, wherein the wavelength demultiplexer is integrated into the PIC.

22. The system of claim 21, wherein the first and second BPFs are integrated into the PIC.

23. The system of claim 18, wherein the reference laser is combined with the frequency comb before the frequency comb passes through the first and the second SGW segments,
wherein the frequency doubler is configured to output at least four optical signals: a first portion of the frequency comb at the first frequency generated by the first SGW, a second portion of the frequency comb at the first frequency produced by the frequency doubler, a third portion of the frequency comb at the second frequency generated by the second SGW, and the reference laser.

24. The system of claim 23, wherein the PIC is configured to receive multiple reference lasers stabilized to different atomic or optical references which are combined with the frequency comb before the frequency comb passes through the first and the second SGW segments.

25. The system of claim 23, further comprising:
a dual-color PD configured to receive the four optical signals; and
a control system configured to generate two beat notes based on electrical signals generated by the dual-color PD.

26. The system of claim 19, further comprising:
a grating configured to receive the three optical signals and transmit the first and second portions of the frequency comb on a first optical path and the third portion of the frequency comb on a second optical path.

27. The system of claim 26, wherein the grating is a vertical surface grating integrated into the PIC or an in-plane grating integrated into the PIC.

28. The system of claim 18, wherein the reference laser is combined with the frequency comb on the PIC after the frequency comb passes through the first and the second SGW segments.

29. The system of claim 17, wherein the frequency doubler is integrated into the PIC.

30. The system of claim 18, wherein the PIC further comprises:
a wavelength demultiplexer disposed between the first SGW segment and the second SGW segment, wherein the wavelength demultiplexer is configured to transmit a first portion of the frequency comb at an original frequency to the second SGW segment using a first waveguide in the PIC and transmit a second portion of the frequency comb at the first frequency on a second waveguide in the PIC.

* * * * *